Aug. 7, 1951 W. W. McGOFFIN 2,563,127

SELECTOR CALLING SYSTEM

Filed April 21, 1948 3 Sheets-Sheet 1

INVENTOR.

W. W. McGoffin

BY P. Stephen Baker

ATTORNEY

Aug. 7, 1951 W. W. McGOFFIN 2,563,127

SELECTOR CALLING SYSTEM

Filed April 21, 1948 3 Sheets-Sheet 2

INVENTOR.
W. W. McGoffin

BY S. Stephen Baker
ATTORNEY

INVENTOR.
W. W. McGoffin
BY
A. Stephen Baker
ATTORNEY

Patented Aug. 7, 1951

2,563,127

UNITED STATES PATENT OFFICE 2,563,127

SELECTOR CALLING SYSTEM

William Walter McGoffin, New York, N. Y., assignor of one-third to S. Stephen Baker, New York, N. Y.

Application April 21, 1948, Serial No. 22,397

8 Claims. (Cl. 177—353)

This invention relates to a selector apparatus providing selective calling or ringing of telephone circuits or the like in association with a conventional radio telephone system.

The invention comprehends the use of a great number of individual selector units, the number running into the thousands or even millions, and wherein one or more may be called or operated through the use of simplified pre-selector banks installed at the site of the unit. It is desirable to have a selector apparatus of the above type which will provide a great number of combinations in the nature of a telephone exchange so that a comprehensive system can be set up and radio dial numbers assigned. The instant apparatus although simple, is capable of providing this large number of combinations so as to avoid duplications of numbers nothwithstanding the scope of the system.

It is another object of this invention to provide such a device wherein group calling is facilitated in that the caller may conveniently select and ring various units so as to be connected thereto, the particular groups being selectable in various combinations by the remote operator.

Still another object of this invention is to provide a system of selector units each of which may be readily set up to respond to a specific call or dial number by the use of various switches provided on the panel, the switches being manually operated to pre-select the desired call. Associated with this object is the provision of such units of small size and weight so as to be suitable for portability or like uses as well as reduction of complexity and reduced expense of manufacture.

A further object of this invention is the provision of a discriminating time delay circuit which protects each selector unit from unnecessary operation and constant random operation by static pulses or transient disturbances. This provision is helpful in insuring long life, minimum servicing and reliable operation of the apparatus.

Still another object of this invention is the further provision of means to transmit information of a predetermined nature which is employed in conjunction with the ringing of the desired station. For example, the station may be capable of operating on many carrier frequencies so as to provide multiple channels. Accordingly, the instant system may be arranged to not only call the desired remote station but to simultaneously indicate the particular frequency which it desires the remote station to use when answering. Thus, the station may be called on a uniform, normal frequency while conversation may be conducted on one of a series of message frequencies.

Other objects of my invention include remote operation of electrical loads through the radio telephone system disclosed, such remote operation permitting a variety of circuits to be selectively closed by a central operation.

Figure 1:
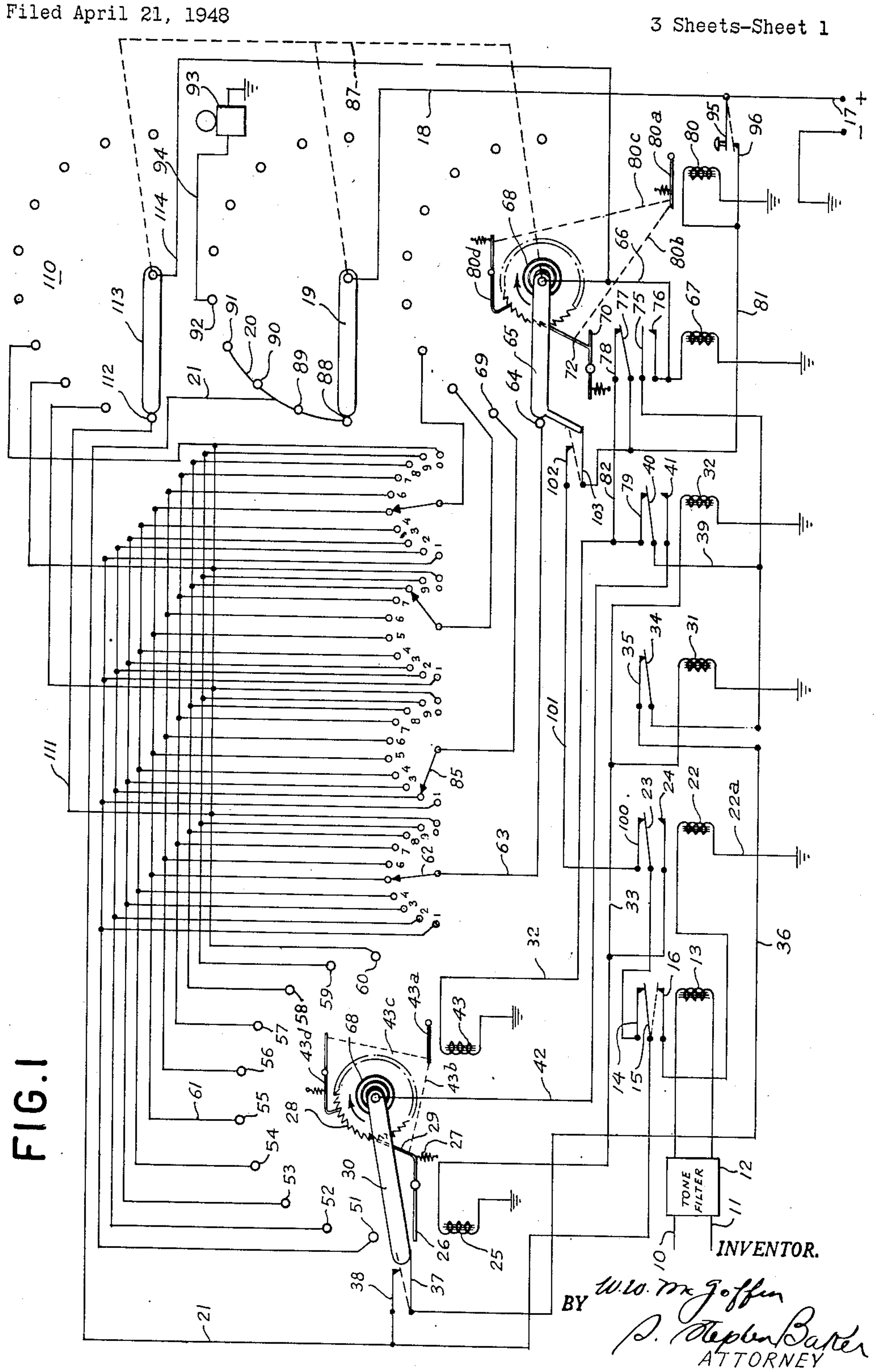
Fig. 1 is a schematic diagram of the apparatus.

The apparatus may be operated through a low or audio frequency tone comprising the modulation on a radio frequency carrier. Thus, the apparatus may be used in conjunction with a receiver and demodulator so as to feed the audio tone to the wires 10 and 11. It is evident, however, that the signals of inaudible frequencies may be employed.

The signals are applied through a tone filter 12 of conventional form so as to largely eliminate undesired frequencies and are then passed through the relay winding 13. Contacts 14 and 15 are normally closed, but upon energization, contact or armature 15 is attracted so as to meet contact 16. Contact 15 is connected to the positive source of potential 17 through wire 18, selector arm 19, selector bank 20 and wire 21.

Attraction of contact 15 energizes relay winding 22 through the wire 22*a* to ground, ground being the negative terminal.

Winding 22 represents a slow closing and slow releasing relay, such function avoiding random operation as from transient disturbances. The remote operator or transmitter will first turn on its tone so as to transmit the tone modulated wave. This tone transmission will be permitted to continue uninterrupted for the closing time constant of winding 22 so as to permit it to close. This may be one second or as high as ten or more seconds. The relay incorporating winding 22 is further slow releasing so as not to fall out during normal tone interruptions on dialing the number as will be hereinafter set forth.

Energization of winding 22 attracts contact or armature 23 to contact 24 so as to feed the dial pulses to the stepper winding 25 representing the stepper relay. It should be observed here that the dial pulses are actually the interruptions of the dialing signal. With each interruption of the signal, armature 15 engages contact 14 and supplies power through contacts 23 and 24 to the stepper 25, the winding 22 maintaining electrical connection between contacts 23 and 24 by virtue of its slow releasing operation.

Operation of stepper 25 attracts armature 26 against the action of spring 27 so as to pivot the armature 26 and rotate the toothed wheel 28 through bell-crank action of the arm 29 against the teeth of wheel 28. Arm 30 is fixed to the shaft of wheel 28 so as to rotate therewith. Accordingly, each time stepper 25 is energized, arm 30 will be advanced one step.

At the same time that stepper 25 is energized, relays 31 and 32 are likewise energized through the wire 33. Both relays 31 and 32 are slow to release, with relay 32 having a slightly longer delay in releasing. For example, relay 31 may have .1 second release time while relay 32 may have a .15 second release time. The delayed releasing time of relay 31 is provided to prevent its dropping out between impulses of a dialed digit. For example, if the number 5 were dialed as by the conventional telephone dial, the time between each impulse of the 5 would not be long enough to permit relay 31 to drop out between digits. However, relay 31 releases when arm 30 has reached a resting place after a particular digit has been dialed. At this time, contact 34 will meet contact 35 which is connected through wire 36 and switch contact 37. Contact 37 normally touches contact 38 which is in turn connected to the positive source of potential. Arm 30 in its initial or starting position biases contact 37 downwardly so that actuation or stepping of arm 30 effects electrical contact between 37 and 38. The positive potential is transmitted at the end of a dialed digit through contact 34, wire 39, armature or contact 40, contact 41, wire 42, arm 30, to one of the contacts 51 to 60 depending upon the position of the arm 30.

Assuming the digit 5 is the first dialed number, the arm 30 will be actuated by five impulses and will reach a first rest position on contact 55. Assume further that the apparatus is set to receive and accept the digit 5 which is accomplished by manually setting the switch arm 62 to the No. 5 position. Accordingly, the positive potential which was present on arm 30 continues through contact 55, wire 61, selector switch arm 62, wire 63, stepper contact 64, stepper arm 65, and wire 66, to stepper relay 67 so as to energize it cocking the armature 70 so as to advance the arm 65 from the first contact 64 to the second contact 69 at the end of the pulsation when the armature 70 returns. Each stepper switch includes a coiled return spring 68 which urges the toothed wheels and stepper arms to starting position. It will be observed therefore that the stepper contacts of the stepper relay 67 electrically connect the two stepper switches through the pre-settable or combination selecting switches.

Both stepper switches are conventional types such as produced by Automatic Electric Mfg. Co., or C. P. Clare and Co., both of Chicago, Ill. In the first embodiment shown, the second stepper switch, which includes actuating relay 67, has three operating levels of radially arranged contacts, the first level being traversed by arm 65. The other levels serve purposes to be hereinafter described.

Relay 67 includes the mechanical armature 70 which is pivoted and connected to the pawl 72 so as to produce the cocking action when actuated. Pawl 72 is caused to ride down one tooth of wheel 73 each time relay 67 is energized, and at the end of the pulsation, the wheel and its connected arm 65 is advanced. Re-set coil 80 is provided for mechanically re-setting the stepper arms by actuating armature 80*a* which is physically connected as by links 80*b* and 80*c* to pawl 72 and dog 80*d* respectively so as to permit return of the stepper wheel. Armature 43*a*, links 43*b* and 43*c*, and dog 43*d* perform the same functions for the first stepper wheel 28.

When relay 67 becomes energized, armature 75 engages contact 76 so as to lock the relay 67 in its energized state through the contacts 34 and 35 which are now engaged, relay 67 thus receiving positive potential through contact 35. At the same time, armature 77 leaves contact 78 so as not to energize the reset relay 80 through wire 81 when relay 32 releases. In other words, the release of relay 32 will reset the stepper arm 65 unless relay 67 has been energized so as to separate 77 and 78. Inasmuch as relay 67 is only energized when the correct impulse is received in accordance with the setting of switch arms 62, 85 etc., it will be evident that the release of relay 32 will only produce a re-set when an undesired digit is received.

When relay 32 releases, its armature 40 meets contact 79 so as to supply its positive potential to wire 82 and reset relay 43. Accordingly, the arm 30 will be reset at the end of the digit so as to await the reception of the next digit. The return of switch arm 30 opens the contacts 37 and 38 so as to remove power from armature 37 to contact 35 as well as all the succeeding circuits. This action further releases the electrical lock on relay 67 which then advances arm 65 by the action above described.

The apparatus is now ready to accept the second sequence of impulses or interruptions thereof representing the second digit. Arm 65 is engaged with contact 69 so that in order to produce a further advance thereof, it is necessary that a digit be dialed corresponding to the position of arm 85 of the second bank of selector switches. It may be observed that if at any time a digit other than a predetermined one is dialed, energizing power will not be distributed through the switch arms 30 and 65 to the relay 67 and the stepper arm 65 will not be advanced. Similarly, since contacts 77 and 78 are engaged, reset 80 is operated together with reset 43 when contacts 40 and 79 are engaged.

Summing up the operation of the relays 31 and 32, it will be recognized that after each dialed digit or character, the first stepper switch is reset so as to be used repeatedly for counting each impulse of a dialed digit. The relays 31 and 32 provide two substantially independent relay circuits during the interval after each dialed digit and before the next digit is dialed. These relay circuits provide momentary actuating impulses, the first momentary impulse being a stepping impulse to the second stepper switch relay 67 so as to advance the stepper wheel 73 and its connected arm 65. This occurs only if the dialed digit conforms to the pre-selected setting as hereinabove described.

The second momentary impulse is a resetting impulse returning the first stepper switch to starting position and further returning the second stepper switch to starting position along with the first stepper whenever a dialed digit does not conform to the pre-set sequence of characters in the code signal. The second stepper switch is further reset as hereinafter described whenever it has not reached the final circuit and the dialing tone is discontinued.

Arm 65 is ganged to the arm 19 by the mechanical linkage 87. Accordingly, arm 19 progresses along the second level of contacts, i. e. from contact 88 to 89 et seq. Contacts 88, 89, 90 and 91 are mutually bridged so that the positive source of potential is applied through wire 21 to contact 38. However, if the proper sequence of code digits pursuant to the presetting of the arms 62, 85, and the remaining bank selector arms are received, arm 19 will eventually engage contact 92 so as to energize the bell 93 through wire 94. It will be recognized, therefore, that receipt of the predetermined code will ring the bell so as to advise that a call is made, and the called station may receive the message or converse over conventional apparatus provided for this purpose.

The advance of the arm 19 to the final contact 92 removes power from the wire 21 so as to discontinue further operation of the apparatus. When hearing the bell, the operator may depress switch arm 95 against contact 96 so as to energize reset relay 80 and return the arms 65 and 19 to starting position and may commence the conversation.

Means are also provided to produce a reset of selector arm 65 when it advances pursuant to one or more digits contained in a different code number but to which its selector switches are set. Thus, for example, if two digits from a different code number coincide with the predetermined code, arm 65 will be advanced, but it should be automatically returned when the other code signal is discontinued. This is effected by the back contact 100 on relay 22 which is connected by wire 101 to contact 102. Contact 102 normally is spring connected to contact 103 in the same manner as contacts 37 and 38. Contact 103 is connected to wire 81. Accordingly contacts 102 and 103 which are separated by arm 65 in its rest position, are brought together when the arm 65 advances. At the end of a signal, the tone will cease so as to release relay 22. This will apply the positive potential to contact 100 and thence to the reset relay 80 through closed contacts 102 and 103. If, however, the proper signal was received so as to bring the arm 19 to the final contact 92, power is removed from the remaining apparatus and applied only to the bell circuit.

The instant invention further provides means for group calling in that a plurality of different stations may be called simultaneously. This is effected by employing supplementary digits to which all or a selected number of the stations respond. For example, the digit zero is included in each bank of 10 selector switches and the zero is directly connected to the third switch contact level 110 of relay 67. The zero of the first switch bank shown is connected by wire 111 to the first contact 112 of the third level. The other zeros are connected to the succeeding contacts. Arm 113 is connected by wire 114 to wire 66 so as to operate the relay 67 and advance the arms 65, 19 and 113 simultaneously. If the predetermined code is received the arm 65 will control the application of energizing current to relay 67. If, on the other hand, one or more zeros are received the arms will advance notwithstanding the pre-selection function of the bank arms since the zeros are pre-connected at all times. Accordingly if stations 7911 to 7999 are to be called simultaneously, the remote operator will call 7900. In the same manner, only one zero or all zeros may be transmitted depending upon the desired group to be called. It will be observed that zero comprises ten impulses so as to advance arm 30 to the last contact.

The instant invention further includes a system for transmitting supplementary information as, for example, an indication of the frequency which the remote station is to employ in answering. A modified apparatus for effecting this purpose is illustrated in Fig. 2.

Figure 2:
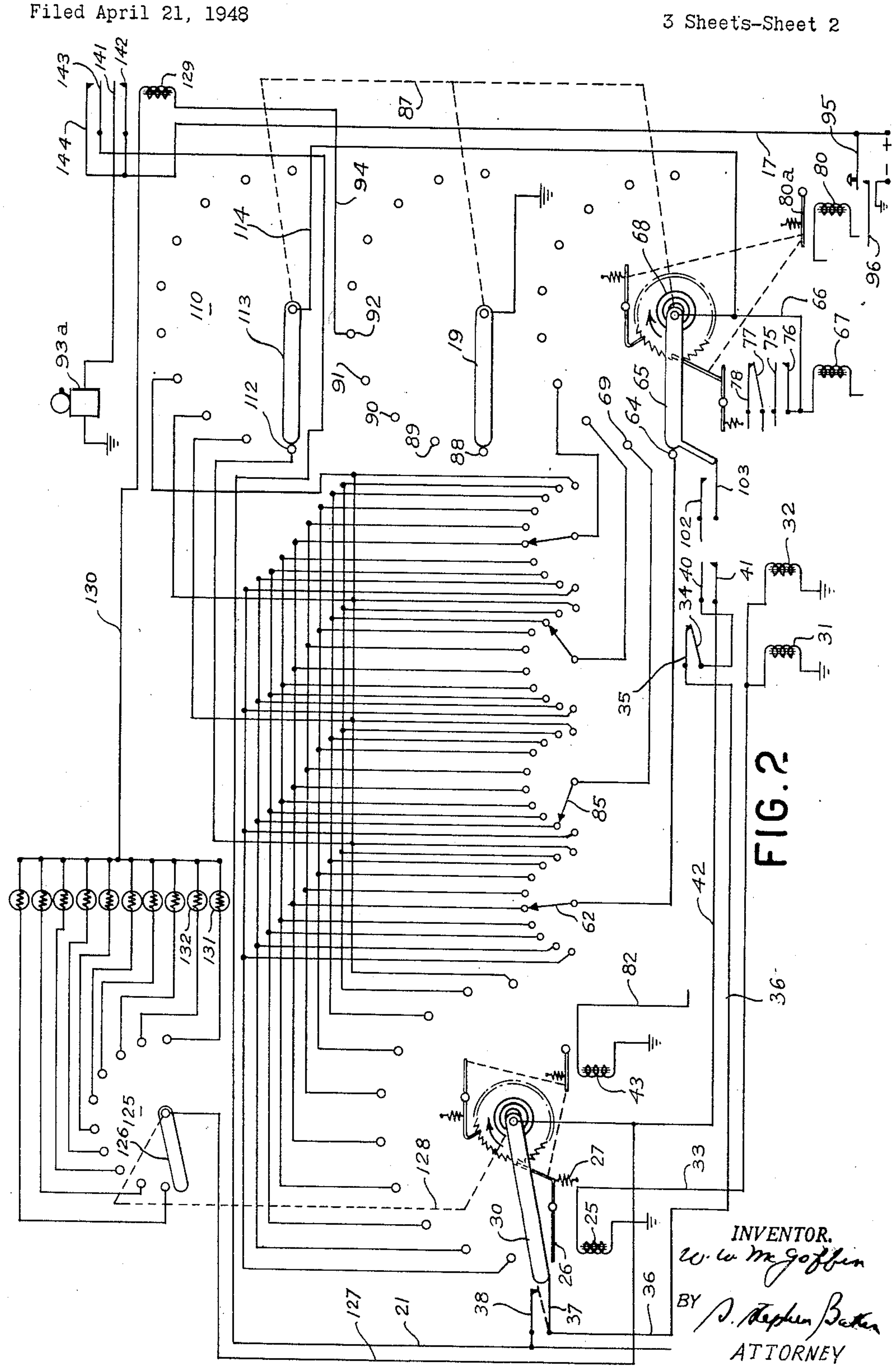
Fig. 2 is a similar view but illustrating a modified embodiment as where further information is supplied together with the alarm.

The apparatus schematically shown in Fig. 2, duplicates the device of Fig. 1 except that a second level of contacts 125 is provided on the first stepper switch. Arm 126 traverses such second level contacts and it is connected by wire 127 to arm 30. Arms 30 and 126 are linked by the mechanical linkage 128. Another deviation from the circuit of Fig. 1 is the modification of the wiring of the second level of contacts of the second stepper switch. Contacts 92, instead of being directly connected to the alarm, is connected to relay winding 129 which is in turn connected, through wire 130, to all of a series of lamps 131, 132 et seq. These lamps are respectively connected to the contacts of level 125. Accordingly, wire 21 receives its positive potential through contacts 144 and 143 instead of through bank 20 and arm 19 as in the circuit of Fig. 1. Further, arm 19 is connected to ground and negative instead of to positive potential.

Assuming now that a four digit number is dialed, arm 19 will be advanced to contact 92 at the end of the fourth digit. At this time, contacts 40 and 41 are open, and positive potential is withheld from relay 129 at the end of the fourth digit. At the very next digit which is dialed, contacts 40 and 41 will close but relay 129 is not energized because contacts 34 and 35 are open. However, at the end of the fifth digit, relay 31 drops out so as to engage contacts 34 and 35 while contacts 40 and 41 are still closed. This completes the positive potential circuit through wire 42, wire 127 and arm 126 and whichever contact of the first stepper's second level on which arm 126 has come to rest. Accordingly, one of the lamps 131, et seq, will be energized through wire 130, the circuit further energizing relay 129 through contact 92 and arm 19 to ground.

When relay 129 is energized, armature 141 is brought to contact 142 which is connected to the positive source of potential so as to sound the alarm 93*a*. Simultaneously, armature 143 is removed from the contact 144 so as to disconnect positive potential from the apparatus save to the alarm.

It will be observed, therefore, that the modification of the second embodiment does not ring the alarm on the fourth digit or character, but it holds back until a fifth digit has been received. The fifth digit may represent a particular frequency or other desired information and it not only operates the alarm according to the code signal comprising four digits but it energizes one of the lights 131 et seq, which may indicate a particular frequency. Thus, the remote station will be apprised by the particular light energized as to which frequency it is desired that it answer upon, or other information such as which one of any ten remote stations is calling.

Figure 3:
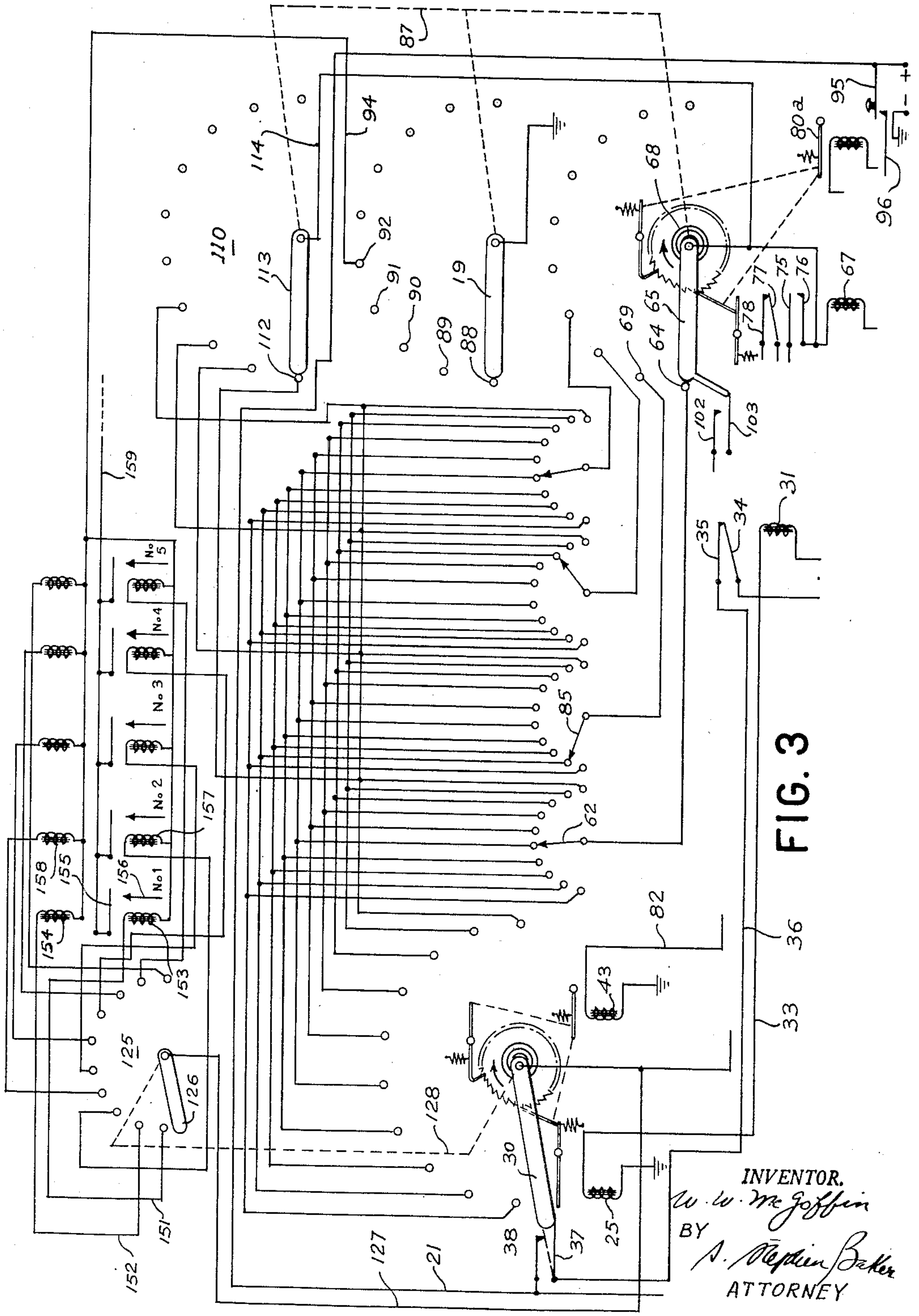
Fig. 3 is a further modified embodiment for turning various circuits on or off.

Fig. 3 is a further modification of the selector system which permits a plurality of individual circuits at the remote station to be turned either on or off at will and independently of each other by the operator of the transmitting station. Five such individual circuits are shown as generally disposed in the position of the lights 131, 132 et seq of the modification of Fig. 2.

In Fig. 3 relay 129 is omitted and wire 21 is directly connected to the positive terminal 17.

Arm 19 of the second level of the second stepper switch is directly grounded. Accordingly, after the first four digits have been accepted in the normal manner so as to advance the second stepper switch arms, arm 19 will engage contact 92 so that when any fifth number is dialed, a circuit will be completed through the second level 125 of the first stepper as explained in the description of Fig. 2.

The relay comprising coils 153, 154 is a conventional mechanical locking relay of the type where momentary energizing of coil 153 closes the circuit of armature 155 to wire 156. Energizing of coil 154, in turn, opens or releases the circuit. Thus, the five circuits No. 1, 2, 3, etc. may be closed or opened by selective operation of the coils 153, 154 or coils 157, 158, etc. Wire 159 is common to all the armatures of the on, off relays.

It will thus be observed that after dialing the fifth digit, the on or off coil in series with the selected circuit will be energized when the normal stepping impulse to the second stepper is applied by the engagement of contacts 35 and 34 following the fifth dialed digit. After such stepping impulse which operates the on or off relay coil in series with that contact of level 125 on which arm 126 comes to momentary rest, the resetting impulse returns both starter wheels to starting position. The second stepper is thus reset because stepping coil 67 is not operated whereas contacts 37 and 38 are closed. However, the selected on or off relay coil was operated and a circuit was accordingly turned on or off. The second stepper automaticaly returns to initial position ready for further operation since no impulse was received by coil 67 so as to advance the stepper and the release pulse resets it, as above described.

Whereas the modification of Fig. 3 does not specifically show an alarm circuit, it is evident that the on, off circuits may be used for this purpose. Contact level 110 of the second stepper is also employed for group calling or operation, as above described.

It will be understood from the foregoing that a selective operating system has been provided which, among other functions described, effects the remote operation of various electrical devices by closing selected load circuits after the remote station itself has been selected by the central operator. Such load circuits include the alarm circuit, the frequency or other information supplying circuits, or the on-off circuits for controlling many operations as will be evident.

While there has been described what at present is considered a preferred embodiment of the invention, it will be evident that many changes and modifications may be made therein without departing from its spirit. It is therefore aimed in the appended claims to cover all such changes and modifications which fall within the true spirit and scope of the invention.

What is claimed is:

1. A selector calling system comprising a first stepper switch including an actuating relay therefor and operating to advance to a position corresponding to the number of impulses in a received digit of a code signal and to return to starting position at the end of each digit of a series of digits comprising said code signal, a second stepper switch including an actuating relay therefor and operating to progress discretely with each received and accepted digit of a desired code signal, each of said stepper switches including a series of contacts and an arm for progressing over said series of contacts, a series of selector switches selectively connected between the contacts of the respective stepper switches each of said selector switches being presettable to determine the acceptance of received digits, the arm of said second stepper switch connecting any particular selector switch to said second stepper switch actuating relay when a received digits corresponds to the setting of the selector switch, said connection to said second stepper switch relay operating to advance said second stepper switch, a supplementary stepper arm on said second stepper switch, an indicating alarm, and an electrical circuit closed by said supplementary stepper arm so as to actuate said alarm when said second stepper switch has progressed a number of discrete steps corresponding to the digits in the desired call signal.

2. A selector calling system comprising a first stepper switch operating to advance to a position corresponding to the number of impulses in a received digit, a second stepper switch operating to progress discretely with each received and accepted digit of a desired number, each of said stepper switches including a series of contacts and an arm for progressing over said series of contacts, a series of selector switches selectively electrically connected between the contacts of the respective stepper switches and operative to determine the acceptance of received digits, a supplementary stepper arm on said second stepper switch, an indicating alarm, and an electrical circuit closed by said supplementary stepper arm so as to actuate said alarm when said second stepper switch has progressed a number of discrete steps corresponding to the digits in the desired number, each of said selector switches including a series of pre-settable switch connections for predetermining the desired number, one of said switch connections in each selector switch representing a group calling connection, an additional series of contacts including a traversing arm therefor on said second stepper switch, each of said group calling connections being electrically connected to one of said additional series of contacts, said traversing arm being connected to one of said additional series of contacts so as to form an electrical circuit with one of said group calling connections; and a relay for advancing said second stepper switch, said traversing arm being connected to said relay.

3. A selector calling system comprising a first stepper switch including an actuating relay therefor and operating to advance to a position corresponding to the number of impulses in a received digit of a code signal and to return to starting position at the end of each digit of a series of digits comprising said code signal, a second stepper switch including an actuating relay therefor and operating to progress discretely with each received and accepted digit of a desired code signal, each of said stepper switches including a series of contacts and an arm for progressing over said series of contacts, a series of selector switches selectively connected between the contacts of the respective stepper switches, each of said selector switches being pre-settable to determine the acceptance of received digits, the arm of said second stepper switch connecting any particular selector switch to said second stepper switch actuating relay when a received digit corresponds to the setting of the selector switch, said connection to said second stepper switch relay operating to advance said second stepper switch, a supplementary stepper arm on said second stepper switch, an indicating alarm, and an electrical circuit closed by said supplementary stepper arm so as to actuate said alarm when said second stepper switch has progressed a number of discrete steps corresponding to the digits in the desired call signal, said selector further including a reset relay winding for said second stepper switch and operative to return said second stepper switch to initial position upon the reception of an undesired digit, said second stepper switch being connected at the release thereof to said second stepper switch reset relay through its actuating relay when its said actuating relay is not energized whereby said second stepper switch relay is operative when an undesired digit is received.

4. A system according to claim 3 and including a supplemental series of contacts including a traversing arm therefor on said second stepper switch, each of said selector switches including switch connections for predetermining acceptable digits, one of said switch connections in each selector switch representing a group calling connection, each of said group calling connections being electrically connected to one of said supplementary series of contacts, said traversing arm being connected to each one of said supplementary series of contacts as it traverses the series so as to form an electrical circuit with any one of said group calling connections, said traversing arm being connected to said actuating relay.

5. A selector calling system for responding to a predetermined code signal consisting of a series of characters, said system comprising a first stepper switch, means for advancing said first stepper switch to a position corresponding to the number of impulses in a received character and for returning it to starting position at the end of each character of a series of characters, an input circuit for feeding the received characters to said stepper switch in the form of impulses, a second stepper switch for advancing in discrete steps as predetermined characters are received, a series of selector switches interposed between and electrically connecting said stepper switches, the connection being selectable according to the characters to be accepted, an indicating alarm including an electrical circuit and an arm on said second stepper switch for closing said alarm electrical circuit when said second stepper switch has advanced to a predetermined point representing the completion of the code signal.

6. A selector calling system for responding to a predetermined code signal, said system comprising a first stepper switch, means for advancing said first stepper switch to a position corresponding to the number of pulses in a received digit, an input circuit connected to said first stepper switch for feeding the received digits to said stepper switch in the form of impulses, a slow closing relay in said input circuit for discriminating against transient impulses not included in said predetermined code, a second stepper switch for advancing in discrete steps as predetermined digits are received, a series of selector switches interposed between and electrically connecting said stepper switches, the connection being selectable according to the digits to be accepted, an indicating alarm including an electrical circuit, and an arm on said second stepper switch for closing said alarm electrical circuit when said second stepper switch has advanced to a predetermined point representing the completion of the code.

7. A selector calling system for responding to a predetermined code signal consisting of a series of characters, said system comprising a first stepper switch connected so as to advance to a position corresponding to the number of impulses in a received character and to return to starting position at the end of each character of the series, an input circuit connected so as to feed the received characters to said stepper switch in the form of impulses, a second stepper switch including an actuating relay therefor for advancing the second stepper switch in discrete steps as predetermined characters are received, a series of selector switches interposed between and electrically connecting said stepper switches, each of said selector switches including a series of selectable electrical contacts and being settable on selected contacts so as to predetermine acceptable characters, a slow releasing relay for closing an electrical circuit through said first stepper switch and one of said series of selector switches to said second stepper switch actuating relay at the end of a received character for which said one of said series of selector switches is preset, the release time of said slow releasing relay being such as to remain closed during the reception of a series of impulses representing one received character, an indicating alarm including an electrical circuit therefor, and an arm on said second stepper switch for closing said alarm electrical circuit when said second stepper switch has advanced to a predetermined point.

8. A selector calling system according to claim 7 and wherein each stepper switch includes a series of contacts and an arm for progressing over the series of contacts, the contacts of said first stepper switch being selectively connected to the contacts of said second stepper switch through said series of selector switches.

WILLIAM WALTER McGOFFIN.

REFERENCES CITED

The following references are of record in the file of this patent:

UNITED STATES PATENTS

| Number | Name | Date |
|---|---|---|
| 1,882,010 | Hershey | Oct. 11, 1932 |
| 2,074,392 | Herbst | Mar. 23, 1937 |
| 2,411,091 | Henderson | Nov. 12, 1946 |
| 2,425,820 | Neiswinter | Aug. 19, 1947 |
| 2,452,052 | Hibbard | Oct. 26, 1948 |
| 2,480,624 | Barnard et al. | Aug. 30, 1949 |